United States Patent [19]
Bosc et al.

[11] 4,346,382
[45] Aug. 24, 1982

[54] DOPPLER RADAR FOR DETECTION AND LOCALIZATION OF HELICOPTERS

[75] Inventors: Henri J. Bosc, Paris; Pierre J. Goyard, Fontenay-le-Fleury, both of France

[73] Assignee: International Standard Electric Corporation, New York, N.Y.

[21] Appl. No.: 168,183

[22] Filed: Jul. 10, 1980

[30] Foreign Application Priority Data

Aug. 23, 1979 [FR] France .................... 79 21210

[51] Int. Cl.³ .................. G01S 13/52; G01S 13/28; G01S 13/44
[52] U.S. Cl. .................. 343/5 SA; 343/16 M; 343/17.2 PC
[58] Field of Search .......... 343/5 SA, 16 M, 17.2 PC

[56] References Cited
U.S. PATENT DOCUMENTS

| 4,038,656 | 7/1977 | Webb, Jr. et al. | 343/5 SA |
| 4,241,350 | 12/1980 | Uffelman | 343/5 SA |
| 4,275,396 | 6/1981 | Jacomini | 343/5 SA |

Primary Examiner—T. H. Tubbesing
Attorney, Agent, or Firm—William T. O'Neil

[57] ABSTRACT

A monopulse radar system in which circuits are included for specific identification of echoes from helicopters vis-avis other echoes. The identification is based on either the large Doppler spectrum of a helicopter echo or the amplitude modulation thereof, or both. Embodiments are shown which utilize these criteria for identification as well as bearing refinement. The apparatus is effective, even when a helicopter is hidden from the full view of the radar by foliage.

13 Claims, 6 Drawing Figures

DOPPLER RADAR FOR DETECTION AND LOCALIZATION OF HELICOPTERS

BACKGROUND OF THE INVENTION

1. Field of the Invention

This invention refers to radar systems capable of detecting and localizing specific targets, specifically helicopters.

2. Description of the Prior Art

In radar surveillance operations, the problem of specific identification of target type is presented. In the case of helicopters, the problem is often complicated by the fact that on the one hand they can hover and, on the other hand, their controllability permits them to hide behind a screen of foliage. Targets masked by foliage can be detected, however, by the use of relatively long wave-lengths. But the use of long wave-lengths implies poor range and angle resolution. The precision of target position measurement can be increased by well known techniques called "simultaneous beam," or "monopulse," but these techniques however do not improve resolution, that is to say the capability of the radar to separate two targets close to each other. In other words, in order for the target position measurement by a monopulse radar to be correct, there must be only one echo in the resolution cell. This resolution cell can be reduced in range by the use of pulse compression, and the target position measurement can be improved by MTI techniques and other techniques affording elimination of undesirable echoes, that is to say in this case those coming from targets other than helicopters.

SUMMARY OF THE INVENTION

The manner in which the present invention uniquely provides helicopter location and identification will be described hereinafter.

An object of this invention is the provision of a radar system capable of detecting and localizing echoes coming from helicopters.

Another more specific object of the invention is provision of a radar system capable of detecting and localizing helicopter echoes even when those echoes are masked by a screen of foliage.

Identification of helicopter echoes is based on the recognition of certain characteristics of the received signal. The echo signal of a hovering helicopter is characterized mainly by the existence of a deep and periodic amplitude modulation giving a wide line spectrum. The frequency of this amplitude modulation is higher than fifteen hertz for all types of helicopters. These helicopter echo characteristics are due to the blades of the rotor and are used, in this invention, as criteria for the recognition of helicopters.

According to one characteristic of this invention, means are provided to eliminate echoes whose percentage modulation is below a given threshold.

According to another characteristic of the invention, means are provided to eliminate echoes whose spectral width is less than a predetermined value.

Other objects, characteristics and advantages of this invention will be brought out more clearly in the following description of particular embodiments of the invention, the said description being given purely for illustration and in connection with the attached typical and illustrative drawings.

BRIEF DESCRIPTON OF THE DRAWINGS

DETAILED DESCRIPTION

Figure 1:
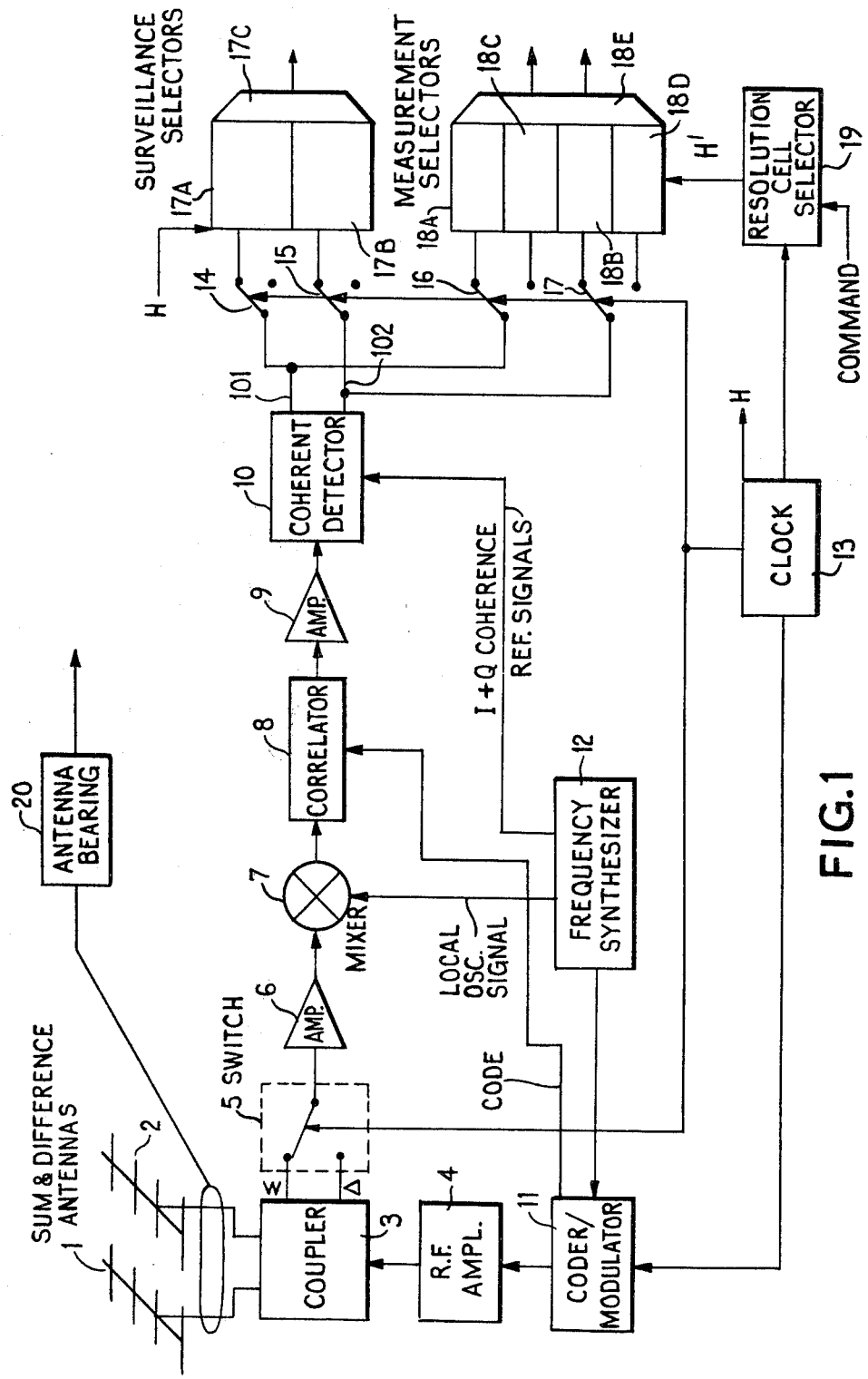
FIG. 1 is a block diagram of a radar in accordance with the principles of this invention.

FIG. 1 shows a radar system in block diagram form which, using the principles of this invention, is designed to detect and determine the position of helicopters. The radar described is of the known "monopulse" type with low transmission frequency and with phase-coded pulse compression. The receiver operates alternately on the sum and difference channels and is coupled to the antennas 1 and 2 through a coupler 3 and switch 5. The transmitted RF signal is generated by a frequency synthesizer 12, then bi-phase modulated in coder/modulator 11 and amplified in 4 for transmission. The bit rate of the bi-phase coding is controlled from the clock circuit 13. The power amplified RF signal output of 4 is fed through coupler 3 to antennas 1 and 2. The receiver contains an RF amplifier 6, a mixer 7 receiving a local signal supplied by the synthesizer 12, a correlator 8 receiving the transmitted code replica from 11, an IF amplifier 9 and a coherent detector 10 receiving I & Q reference signals (in quadrature) from the synthesizer 12. We obtain at outputs 101 and 102 of the coherent detector 10 the sine and cosine components (I and Q) respectively of the sum ($\Sigma$) and difference ($\Delta$) channels alternately, according to electronic switching (commutating) provided by switch 5.

As mentioned above, two criteria can be used to discriminate between helicopter echoes and those from other sources. These two criteria are the width of the Doppler spectrum and the existence of a deep and periodic amplitude modulation. Several variants of the invention are therefore possible, depending upon whether the signal processing employs one or the other or both of these criteria. In addition, detected targets can be localized either by determining when the difference channel passes through zero, or by calculating the true azimuth giving a constant plot during the time the beam passes over the target. During this time, a conventional "range bin" (resolution cell) selector 19 ascertains a range coordinate in a known manner.

According to one variant of the invention, the sine and cosine components at the output of the coherent detector 10 are applied alternately by electronic switches 14, 15, 16 and 17, to a bank of surveillance selectors 17A, 17B, 17C (one selector per range bin) and to a measurement selector (18A–18E) as shown in FIG. 1.

Figure 2:
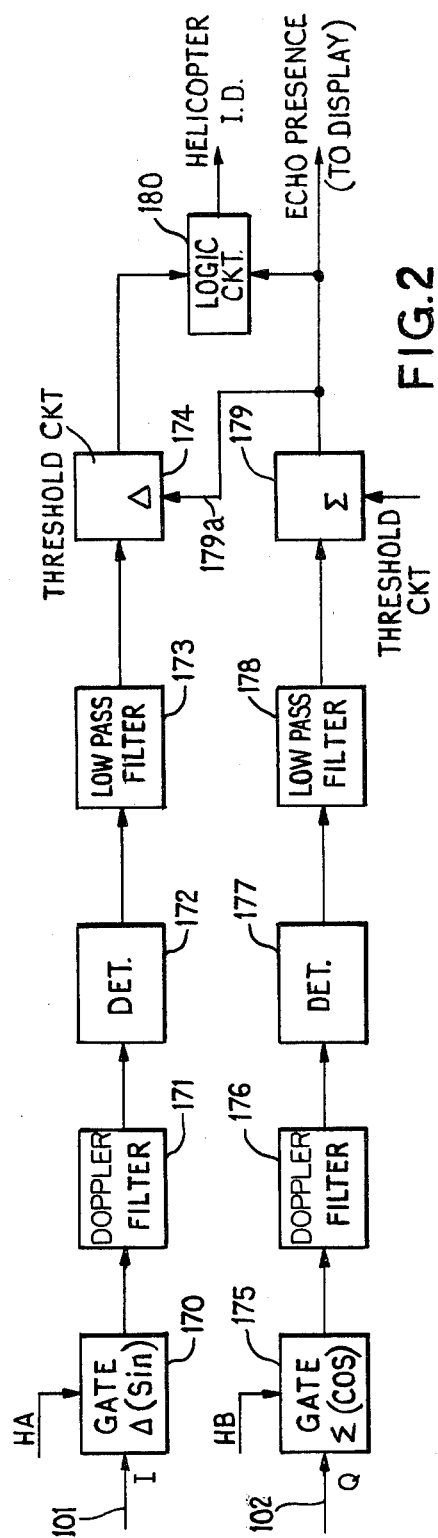
FIG. 2 shows a first variant of a surveillance selector.
Figure 3:
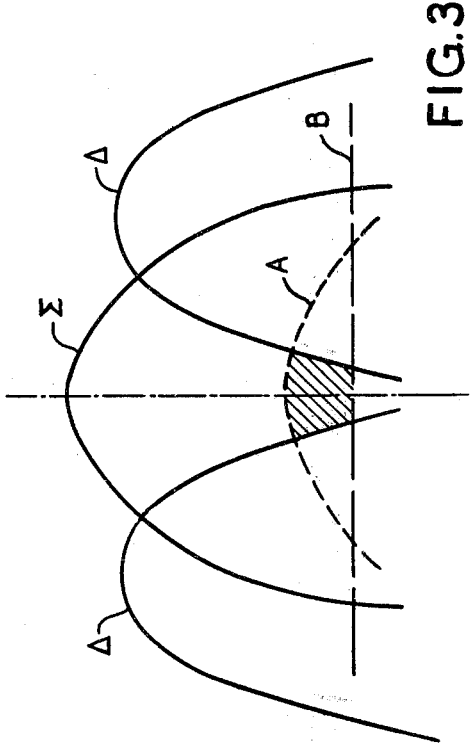
FIG. 3 shows various curves used to explain the operation of the selector of FIG. 2.

The block diagram of FIG. 2 shows an example of a surveillance selector which uses only the criterion of spectral width of the echo as a means of distinguishing helicopter echoes. The selector contains gates 170 and 175 connected respectively to outputs 101 and 102 of the coherent detector 10 and allowing the passage, upon the control of clock signals HA and HB, the sine component of the difference $\Delta$ channel (gate 170) and the cosine component of the sum $\Sigma$ channel (gate 175). Only one sine or cosine component may be used for the sum $\Sigma$ channel as is the case for the difference $\Delta$ channel. The output of gates 170 and 175 are applied to Doppler filters 171 and 176, respectively, these having low cut-off frequencies such that most of the clutter and slow moving undesirable echoes are eliminated. Thus, with a transmission frequency of one hundred sixty megahertz, a low cut-off frequency for the Doppler filters of thirty hertz permits the elimination of echoes from targets having a radial speed, with respect to the radar, of less than about one hundred kilometers per hour. The upper cut-off frequency is such that the filter passes most of the energy contained in the spectra of helicopter echoes and can be on the order of one hundred to two hundred hertz. The Doppler filters 171 and 176, are followed by detectors 172 and 177, respectively, whose outputs are filtered by low-pass filters 173 and 178, respectively, and then applied to threshold circuits 174 and 179, respectively. Circuit 179, placed in the Σ cosine channel, compares the output signal of filter 178 to a fixed threshold (labeled B in FIG. 3). On the other hand, the threshold applied to the Δ sine channel (labeled A in FIG. 3) is a function of the amplitude of the Σ cosine channel and is controlled by the output signal of circuit 179 via lead 179a. The diagram of FIG. 3 shows how a point can be identified in the center of the beam. Logic circuit 180 furnishes a signal, based on the output signals of threshold circuits 174 and 179, to a display device (not shown) when the signal on the Δ channel is below the threshold (curve A in FIG. 3) controlled by the amplitude of the signal on the Σ channel and this later signal is above threshold B.

The output of threshold circuit 179 furnishes an "echo presence" signal which can be sent to the display device.

From the output signals of the coherent detector, it is also possible to continuously calculate the angular displacement between the target and the beam axis during the rotation of the antenna.

The following paragraph describes the deviation of the value of the angular deviation θ between the target and the axis of the complex antenna, the antenna complex comprising two identical antennas separated by a distance "D", and each having a radiation pattern f(θ). During transmission, both antennas are excited in phase and the field, in the direction θ and at a distance Cτ/2, in complex notation is equal to $$f(\theta) \left[ e^{j\{\omega(t-\frac{\tau}{2})+\frac{\phi}{2}\}} + e^{j\{\omega(t-\frac{\tau}{2})-\frac{\phi}{2}\}} \right] \quad \text{eqn 1}$$

which can be rewritten:

$$2f(\theta) \left[ \cos \omega \left( t - \frac{\tau}{2} \right) + j \sin \omega \left( t - \frac{\tau}{2} \right) \right] \cos \frac{\phi}{2}. \quad \text{eqn 2}$$

In the above expressions, ω represents the angular frequency of the transmitted signal, τ/2 represents the transmitted wave path time in air and φ represents the phase shift between the two antennas. This phase shift φ is equal to 2π(d/λ) sin θ, if λ is the wave-length of the transmitted signal. The returning echo signals received by the two antennas may be written as $$2f^2(\theta)[\cos \omega(t - \tau) + j \sin \omega(t - \tau)] \cos \frac{\phi}{2} e^{\pm j\frac{\phi}{2}}.$$

after demodulation by the reference wave "ωτ", and letting ωτ=ψ, we obtain $$2f^2(\theta)[\cos \psi - j \sin \psi] \cos \frac{\phi}{2} e^{\pm j\frac{\phi}{2}}.$$

The sum signal Σ and the difference signal Δ are respectively $$\Sigma = 4f^2(\theta)[\cos \psi - j \sin \psi] \cos^2 \frac{\phi}{2}$$

$$\Delta = 4jf^2(\theta)[\cos \psi - j \sin \psi] \cos \frac{\phi}{2} \sin \frac{\phi}{2}.$$

The quotient Q of the difference signal Δ over the sum signal Σ allows us to know the angular deviation θ. Thus, we have:

$$Q = \frac{-j\Delta}{\Sigma} = tg\left(\frac{\phi}{2}\right) = tg\left(\pi \frac{d}{\lambda} \sin \theta\right) \quad \text{eqn 3}$$

Figure 4:
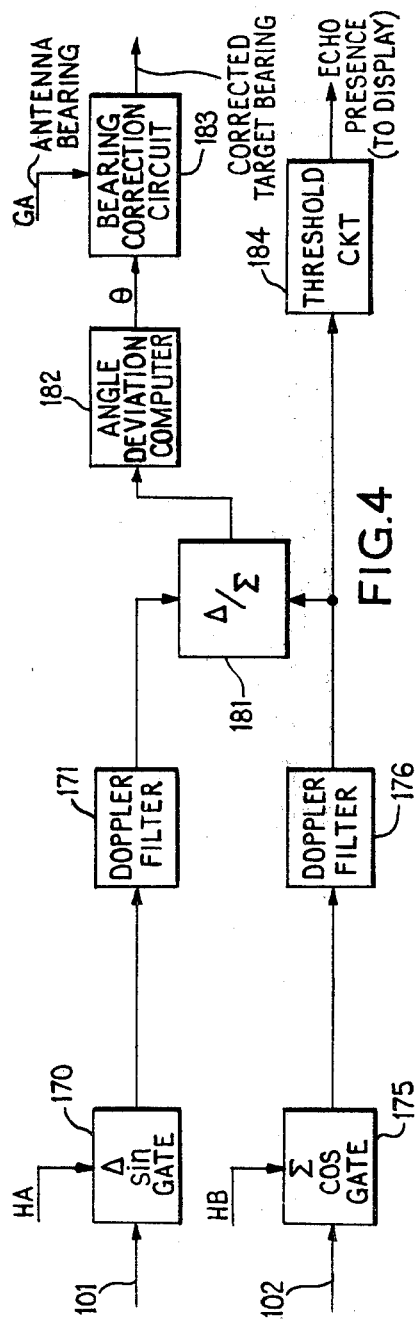
FIGS. 4, 5 and 6 show other variants of the surveillance and/or measurement selector using the principles of this invention.

An embodiment of a deviation calculation circuit based on the foregoing is shown in FIG. 4. The Δ channel sine and the Σ channel cosine components gated in 170 and 175 as previously, are applied to Doppler filters. The output signals of these Doppler filters 171 and 176 are applied to a circuit 181 which calculates the quotient Δ/Σ of the difference channel Δ signal over the sum channel Σ signal. Circuit 183 determines the angular deviation θ (i.e. solves eqn 3 for θ) between the target and the antenna axis from the value of the quotient Δ/Σ, and circuit 183 furnishes the true bearing of the target from the angular deviation θ and the instantaneous bearing GA of the antenna. A threshold circuit 184 is also provided on the Σ channel so as to eliminate noise.

Figure 5:
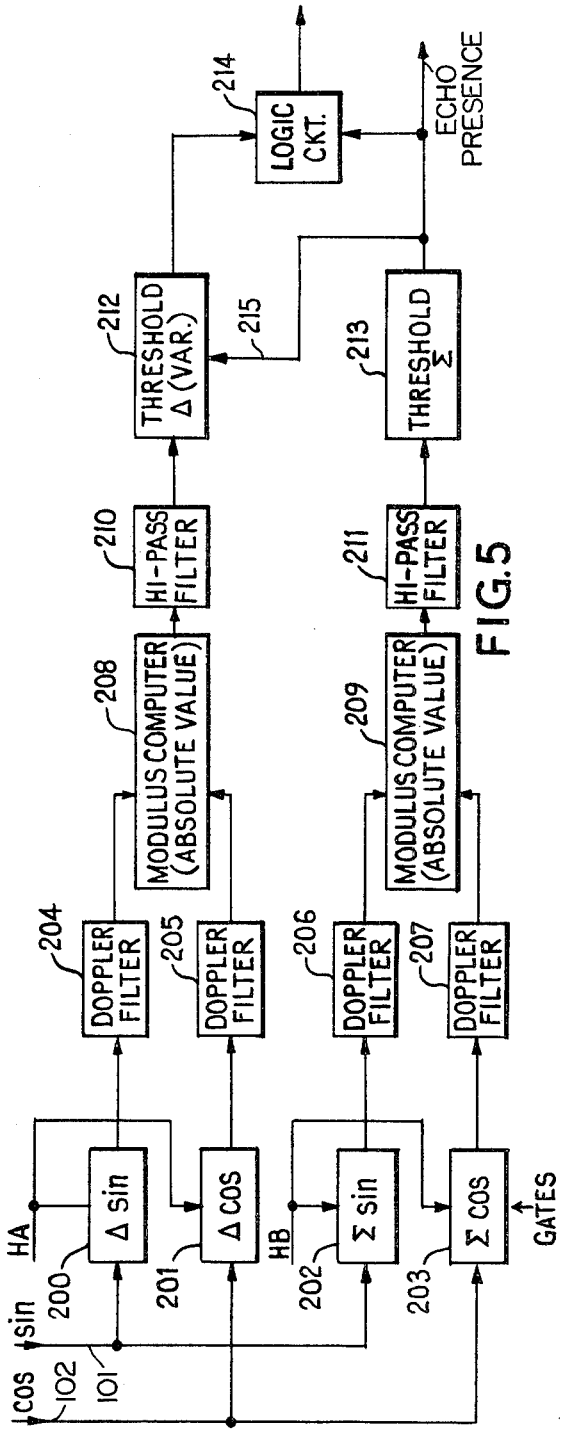
Figure 6:
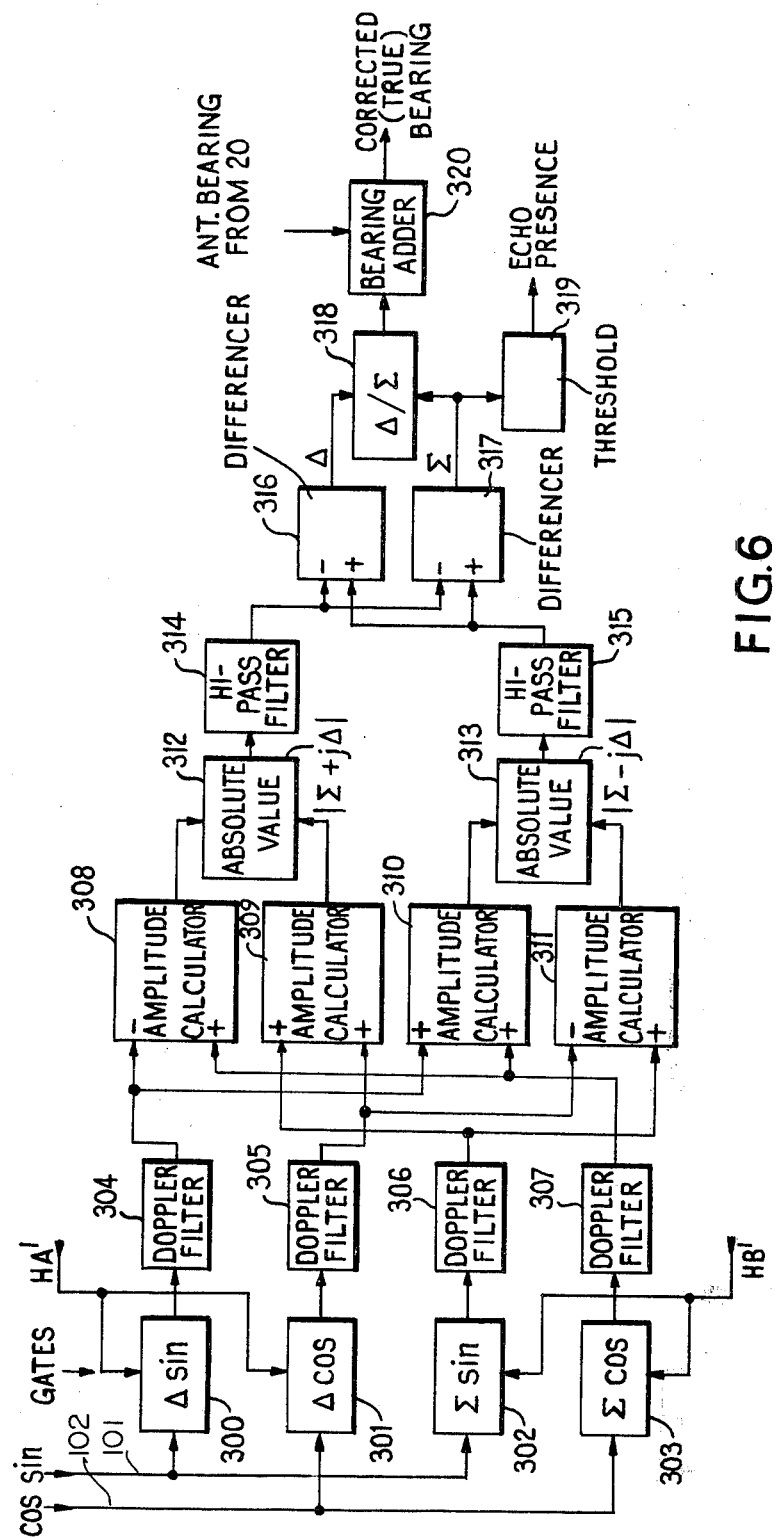

A device such as the one in FIG. 4 however would allow echoes to pass coming from high-speed targets which are not eliminated by the Doppler filters. In order to reduce the number of such false alarms from the radar, a further variant of the invention then proposes to also use the criterion of amplitude modulation recognition. FIG. 5 shows how this criterion can be utilized for a surveillance selector and FIG. 6 shows how it can be used for a measurement selector.

In the surveillance selector according to FIG. 5, the sine and cosine components of the difference Δ and sum Σ channels are obtained at the output of gates 200, 201, 202 and 203 which are, as they are in the case of FIG. 4, controlled by the clock signals HA and HB. A doppler filter 204, 205, 206, or 207 is included at the output of each of the gates 200 to 203 as shown. The moduli of the difference Δ and sum Σ signals (absolute values of the resultants of sine and cosine components) are produced by circuits 208 and 209 respectively, and then filtered by filters 210 and 211 which allow only echoes amplitude-modulated by a frequency higher than a given threshold (about ten hertz) to pass. Filters 210 and 211 are followed by threshold circuits identical to those in FIG. 2. Thus, we find a fixed-threshold circuit 213 in the Σ channel whose output is used to control the variable threshold of the Δ channel (circuit 212). A plot is therefore marked when the signal in the Σ channel is above a given fixed threshold and the signal in the Δ channel below a variable threshold. Gate 214 furnishes a signal when this double condition is fulfilled.

As in the case of FIG. 2, circuit 213 supplies an "echo presence" signal which can be used when the signal-to-noise ratio does not permit an angular position measurement.

The device in FIG. 5 generates the moduli of the signals of the Δ and Σ channels, from which it is no longer possible to determine the sign of the angular deviation between the target and the antenna axis. Accordingly, a measurement selector is proposed, according to a further variant of the invention, permitting discrimination of the echoes by spectral width and by amplitude modulation and the calculation of the value and sign of the angular deviation. Such an embodiment is shown in FIG. 6.

In FIG. 6, gates 300, 301, 302 and 303 allow the passage of the sine and cosine components of the difference Δ and sum Σ channels respectively under the control of the clock signals HA' and HB'. The clock signals HA' and HB' define the range of the resolution cell examined, and can be controlled (circuit 19, FIG. 1) either manually (command) or automatically from the output information of the surveillance selectors 17. The output signals from gates 300 to 303 are filtered by the Doppler filters 304, 305, 306 and 307 respectively. Circuits 308 to 313 serve to calculate the amplitudes $|\Sigma+j\Delta|$ and $|\Sigma-j\Delta|$, with $$\Sigma + j\Delta = \Sigma \cos - \Delta \sin + j(\Sigma \sin + \Delta \cos),$$

and $$\Sigma - j\Delta = \Sigma \cos + \Delta \sin + j(\Sigma \sin - \Delta \cos).$$

Circuits 308, 309 produce the sums of ($\Sigma \cos - \Delta \sin$) and ($\Sigma \sin + \Delta \cos$) respectively and circuit 312 calculates the modulus $|\Sigma+j\Delta|$. Similarly, the circuits 310 and 311 produce the sums of ($\Sigma \cos + \Delta \sin$) and ($\Sigma \sin - \Delta \cos$) respectively and circuit 313 calculates the modulus $|\Sigma-j\Delta|$. The modulus calculators 312 and 313 are each followed by a high-pass filter 314 and 315. The differencer circuits 316, 317 and divider 318 serve to determine the quotient of the difference signal Δ over the sum signal Σ from the moduli $|\Sigma+j\Delta|$ and $|\Sigma-j\Delta|$.

We have seen above that signals Σ and Δ were written:

$$\Sigma = 4f^2(\theta) \cos \frac{\phi}{2} [\cos \psi - j \sin \psi] \cos \frac{\phi}{2}$$

$$\Delta = 4f^2(\theta) \cos \frac{\phi}{2} [-\sin \psi - j \cos \psi] \sin \frac{\phi}{2}$$

Hence, by letting $$K = 4f^2(\theta) \cos \frac{\phi}{2} :$$

$$\Sigma + j\Delta = \Sigma\cos - \Delta\sin + j(\Sigma\sin + \Delta\cos)$$

$$= K \left( \cos \frac{\phi}{2} - \sin \frac{\phi}{2} \right) (\cos \psi - j \sin \psi) \text{ and}$$

$$\Sigma - j\Delta = \Sigma\cos + \Delta\sin + j(\Sigma\sin - \Delta\cos)$$

$$= K \left( \cos \frac{\phi}{2} + \sin \frac{\phi}{2} \right) (\cos \psi - j \sin \psi).$$

If we take the quotient $$Q = \frac{|\Sigma - j\Delta| - |\Sigma + j\Delta|}{|\Sigma - j\Delta| + |\Sigma + j\Delta|},$$

we obtain $$Q = \frac{\sin \frac{\phi}{2}}{\cos \frac{\phi}{2}} = tg \frac{\phi}{2}$$

Now, since $\phi = 2\pi\phi/\lambda \sin \theta$, we can therefore deduce the value of the deviation $\theta$.

Thus, differencer circuit 316 calculates the value of the numerator, that is to say the expression $|\Sigma - j\Delta| - |\Sigma + j\Delta|$, circuit 317 calculates the value of the denominator, that is to say the expression $|\Sigma - j\Delta| + |\Sigma + j\Delta|$ and circuit 318 calculates the value of the quotient Q. The value of the deviation can then be added to the bearing given by the antenna drive mechanisms 20 in bearing adder 320, in order to obtain the true bearing value of the target.

Echo presence is identified when a predetermined value of differencer 317 output is recognized in 319, i.e., exceeding a predetermined threshold in 319.

It will be recalled that the echo signal coming from a helicopter is characterized by a deep and periodic amplitude modulation, this having now been included as an identification criterion. As a further observation, the frequency of the modulating signal can be shown to be constant for a given type of helicopter, it is therefore possible to recognize the type of helicopter by measuring, for example by means of a phase loop, the frequency of the amplitude modulation. This measurement could be made in the measurement selector.

Although this invention has been described in connection with particular embodiments, it is not limited to the said examples and is capable of being modified and varied once it is understood. For one example, the filtering and localization circuits could well be designed in digital form if the number of range gates became large, with analog-to-digital conversion taking place at the sine and cosine outputs of the coherent detector.

What is claimed is:

1. A radar system for discrete identification and localization of helicopters comprising:
   a radar transmitter and antenna system for illuminating a target with electromagnetic energy;
   a receiver responsive to echo signals from said target resulting from said illumination; and
   evaluation means responsive to output signals of said receiver for rejecting echo signals not characteristic of helicopter echoes, said evaluation means including circuits for applying the criteria of percentage amplitude modulation, the criterion of spectral width or both of said criteria, said evaluation means acting to reject echo signals having spectral width below a predetermined value, echo signals having a percentage of amplitude modulation below a predetermined value or to reject said echo signals failing to exceed either of said predetermined values.

2. A radar system according to claim 1 further including means within said transmitter, antenna and receiver for providing monopulse operation and coherent phase-coded transmissions with pulse compression reception.

3. A radar system according to claim 2 in which said evaluation means includes a plurality of surveillance selectors corresponding to a plurality of range bins and delivering an output signal when the spectral width of the received signal applied thereto meets at least one of said evaluation means criteria.

4. Apparatus according to claim 3 further including a measurement selector providing, for each of said range bins, the value of the angular deviation between the instantaneous angular position of the axis of said antenna and a target echo exceeding at least one of said evaluation means criteria.

5. Apparatus according to claim 4 in which said monopulse radar system is defined as including sum and difference channels, $\Sigma$ and $\Delta$, respectively, and in which said surveillance selectors are defined as including means for delivering an output when the signal in said sum channel exceeds a first threshold value and the signal in said difference channel is less than a second threshold value.

6. Apparatus according to claim 5 in which said surveillance selectors are present in both said sum and difference channels, and said channels each include, in a signal flow series, a Doppler filter, a detector, a low-pass filter and a threshold circuit for setting said threshold values.

7. Apparatus according to claim 6 further including a quotient determining circuit for calculating the value of $\Delta/\Sigma$.

8. Apparatus according to claim 6 in which each of said surveillance selectors comprise in-phase and quadrature sub-channels for said $\Sigma$ and $\Delta$ channels, in which a modulus computer is connected for determining the absolute value of signal in said $\Sigma$ and $\Delta$ channels, said modulus computer being responsive to said sub-channels in each of said $\Sigma$ and $\Delta$ channels, and including a hi-pass filter between each of said modulus computers and said threshold circuits.

9. Apparatus according to claim 8 in which said measurement selector comprises:

a Doppler filter responsive to each of said sub-channels in each of said $\Sigma$ and $\Delta$ channels;

a first circuit for computing $|\Sigma+j\Delta|$ from the output signals of said Doppler filters;

a second circuit for computing $|\Sigma-j\Delta|$ from the output signals of said Doppler filters;

a hi-pass filter at the output of each of said first and second circuits; and quotient computer means receiving the output signals of each of said hi-pass filters for calculating the value $$\frac{|\Sigma - j\Delta| - |\Sigma + j\Delta|}{|\Sigma - j\Delta| + |\Sigma + j\Delta|}.$$

10. A radar system according to claim 1 in which said evaluation means includes a plurality of surveillance selectors corresponding to a plurality of range bins and delivering an output signal when the spectral width of the received signal applied thereto meets at least one of said evaluation means criteria.

11. A radar system for discrete identification and localization of helicopters, comprising:
   a radar transmitter and antenna system for illuminating a target with electromagnetic energy;
   a receiver responsive to echo signals from said target resulting from said illumination; and
   means within said receiver for detecting amplitude modulation on said echo signals and for rejecting echo signals, the percentage modulation of which is below a predetermined value.

12. A radar system for discrete identification and localization of helicopters, comprising:
   a radar transmitter and antenna system for illuminating a target with electromagnetic energy;
   a receiver responsive to echo signals from said target resulting from said illumination; and
   means within said receiver for detecting the spectral width of said echoes and for rejecting echo signal, the spectral width of which is less than a predetermined value.

13. A radar system according to claims 11 or 12 further including means within said transmitter, antenna and receiver for providing monopulse operation and coherent phase-coded transmissions with pulse compression reception.

* * * * *